(12) United States Patent
Cooke et al.

(10) Patent No.: US 7,934,027 B2
(45) Date of Patent: Apr. 26, 2011

(54) CRITICAL RESOURCE MANAGEMENT

(75) Inventors: Thomas Cooke, Colorado Springs, CO (US); Richard B. Rodriguez, Colorado Springs, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 304 days.

(21) Appl. No.: 11/655,456

(22) Filed: Jan. 19, 2007

(65) Prior Publication Data

US 2008/0178188 A1    Jul. 24, 2008

(51) Int. Cl.
*G06F 3/00* (2006.01)
*G06F 9/46* (2006.01)

(52) U.S. Cl. .......................................... 710/54; 718/104
(58) Field of Classification Search .................... 710/54; 718/104
See application file for complete search history.

(56) References Cited

U.S. PATENT DOCUMENTS

| | | | |
|---|---|---|---|
| 5,056,003 A * | 10/1991 | Hammer et al. | 719/310 |
| 5,603,066 A * | 2/1997 | Krakirian | 710/74 |
| 5,671,377 A * | 9/1997 | Bleidt et al. | 715/723 |
| 5,761,507 A * | 6/1998 | Govett | 718/101 |
| 5,784,647 A * | 7/1998 | Sugimoto | 710/39 |
| 5,923,876 A | 7/1999 | Teague | |
| 6,055,533 A * | 4/2000 | Hogge | 707/7 |
| 6,055,564 A * | 4/2000 | Phaal | 709/207 |
| 6,073,132 A * | 6/2000 | Gehman | 707/9 |
| 6,161,192 A | 12/2000 | Lubbers | |
| 6,170,063 B1 | 1/2001 | Golding | |
| 6,205,484 B1 * | 3/2001 | Eriksson | 709/229 |
| 6,295,578 B1 | 9/2001 | Dimitroff | |
| 6,314,477 B1 * | 11/2001 | Cowger et al. | 710/22 |
| 6,397,293 B2 | 5/2002 | Shrader | |
| 6,434,559 B1 * | 8/2002 | Lundberg et al. | 707/7 |
| 6,487,636 B1 | 11/2002 | Dolphin | |
| 6,490,122 B1 | 12/2002 | Mueller | |
| 6,493,656 B1 | 12/2002 | Houston | |
| 6,505,268 B1 | 1/2003 | Schultz | |
| 6,523,749 B2 | 2/2003 | Reasoner | |
| 6,546,459 B2 | 4/2003 | Rust | |
| 6,560,673 B2 | 5/2003 | Elliott | |
| 6,587,962 B1 | 7/2003 | Hepner | |
| 6,594,745 B2 | 7/2003 | Grover | |
| 6,601,187 B1 | 7/2003 | Sicola | |
| 6,606,690 B2 | 8/2003 | Padovano | |
| 6,609,145 B1 | 8/2003 | Thompson | |
| 6,629,108 B2 | 9/2003 | Frey | |
| 6,629,273 B1 | 9/2003 | Patterson | |
| 6,643,795 B1 | 11/2003 | Sicola | |
| 6,647,514 B1 | 11/2003 | Umberger | |
| 6,658,590 B1 | 12/2003 | Sicola | |
| 6,663,003 B2 | 12/2003 | Johnson | |
| 6,681,308 B1 | 1/2004 | Dallmann | |
| 6,708,285 B2 | 3/2004 | Oldfield | |
| 6,715,101 B2 | 3/2004 | Oldfield | |
| 6,718,404 B2 | 4/2004 | Reuter | |
| 6,718,434 B2 | 4/2004 | Veitch | |
| 6,721,902 B1 | 4/2004 | Cochran | |

(Continued)

*Primary Examiner* — Henry W Tsai
*Assistant Examiner* — Hyun Nam (57) ABSTRACT

In one embodiment, a method of managing critical resource usage in a storage network comprises receiving, in a storage controller, an input/output operation from a host, wherein the input/output operation identifies a storage unit, placing the input/output operation in a waiting queue, determining a maximum queue depth for at least one critical resource in the storage network required to execute the input/output command against the storage unit, and blocking one or more subsequent input/output commands from the host for the storage unit when the wait queue for the critical resource exceeds the maximum queue depth.

11 Claims, 5 Drawing Sheets

U.S. PATENT DOCUMENTS

| | | |
|---|---|---|
| 6,725,393 B1 | 4/2004 | Pellegrino |
| 6,742,020 B1 | 5/2004 | Dimitroff |
| 6,745,207 B2 | 6/2004 | Reuter |
| 6,763,409 B1 | 7/2004 | Elliott |
| 6,772,231 B2 | 8/2004 | Reuter |
| 6,775,790 B2 | 8/2004 | Reuter |
| 6,795,904 B1 | 9/2004 | Kamvysselis |
| 6,802,023 B2 | 10/2004 | Oldfield |
| 6,807,605 B2 | 10/2004 | Umberger |
| 6,817,522 B2 | 11/2004 | Brignone |
| 6,823,453 B1 | 11/2004 | Hagerman |
| 6,839,824 B2 | 1/2005 | Camble |
| 6,842,833 B1 | 1/2005 | Phillips |
| 6,845,403 B2 | 1/2005 | Chadalapaka |
| 6,922,414 B1 * | 7/2005 | Gunlock ............... 370/412 |
| 7,376,755 B2 * | 5/2008 | Pandya ............... 709/250 |
| 2001/0011296 A1 * | 8/2001 | Chidambaran et al. ...... 709/203 |
| 2002/0013864 A1 * | 1/2002 | Dandrea et al. ............. 710/6 |
| 2002/0019863 A1 | 2/2002 | Reuter |
| 2002/0019908 A1 | 2/2002 | Reuter |
| 2002/0019920 A1 | 2/2002 | Reuter |
| 2002/0019922 A1 | 2/2002 | Reuter |
| 2002/0019923 A1 | 2/2002 | Reuter |
| 2002/0048284 A1 | 4/2002 | Moulton |
| 2002/0188800 A1 | 12/2002 | Tomaszewski |
| 2003/0051109 A1 | 3/2003 | Cochran |
| 2003/0056038 A1 | 3/2003 | Cochran |
| 2003/0063134 A1 | 4/2003 | Lord |
| 2003/0074492 A1 | 4/2003 | Cochran |
| 2003/0079014 A1 | 4/2003 | Lubbers |
| 2003/0079074 A1 | 4/2003 | Sicola |
| 2003/0079082 A1 | 4/2003 | Sicola |
| 2003/0079083 A1 | 4/2003 | Lubbers |
| 2003/0079102 A1 | 4/2003 | Lubbers |
| 2003/0079156 A1 | 4/2003 | Sicola |
| 2003/0084241 A1 | 5/2003 | Lubbers |
| 2003/0101318 A1 | 5/2003 | Kaga |
| 2003/0110237 A1 | 6/2003 | Kitamura |
| 2003/0126315 A1 | 7/2003 | Tan |
| 2003/0126347 A1 | 7/2003 | Tan |
| 2003/0140191 A1 | 7/2003 | McGowen |
| 2003/0145045 A1 | 7/2003 | Pellegrino |
| 2003/0145130 A1 | 7/2003 | Schultz |
| 2003/0170012 A1 | 9/2003 | Cochran |
| 2003/0177323 A1 | 9/2003 | Popp |
| 2003/0187847 A1 | 10/2003 | Lubbers |
| 2003/0187947 A1 | 10/2003 | Lubbers |
| 2003/0188085 A1 | 10/2003 | Arakawa |
| 2003/0188114 A1 | 10/2003 | Lubbers |
| 2003/0188119 A1 | 10/2003 | Lubbers |
| 2003/0188153 A1 | 10/2003 | Demoff |
| 2003/0188218 A1 | 10/2003 | Lubbers |
| 2003/0188229 A1 | 10/2003 | Lubbers |
| 2003/0188233 A1 | 10/2003 | Lubbers |
| 2003/0191909 A1 | 10/2003 | Asano |
| 2003/0191919 A1 | 10/2003 | Sato |
| 2003/0196023 A1 | 10/2003 | Dickson |
| 2003/0212781 A1 | 11/2003 | Kaneda |
| 2003/0229651 A1 | 12/2003 | Mizuno |
| 2003/0236953 A1 | 12/2003 | Grieff |
| 2004/0019740 A1 | 1/2004 | Nakayama |
| 2004/0024838 A1 | 2/2004 | Cochran |
| 2004/0024961 A1 | 2/2004 | Cochran |
| 2004/0030727 A1 | 2/2004 | Armangau |
| 2004/0030846 A1 | 2/2004 | Armangau |
| 2004/0049634 A1 | 3/2004 | Cochran |
| 2004/0078638 A1 | 4/2004 | Cochran |
| 2004/0078641 A1 | 4/2004 | Fleischmann |
| 2004/0128404 A1 | 7/2004 | Cochran |
| 2004/0168034 A1 | 8/2004 | Homma |
| 2004/0215602 A1 | 10/2004 | Cioccarelli |
| 2004/0230859 A1 | 11/2004 | Cochran |
| 2004/0267959 A1 | 12/2004 | Cochran |
| 2005/0240649 A1 | 10/2005 | Elkington |

* cited by examiner

CRITICAL RESOURCE MANAGEMENT

BACKGROUND

A typical, complex, resource based, computing system, such as an advanced data storage array controller, requires large pools of memory in which queues are created for the aggregation of commands and operations to increase efficiency. An example of this type of queue would be a group of memory buffers for the aggregation of data to be written to a group of disk drives, allowing for burst write operations, which are more efficient and reduce overall system latencies. As load increases on these types of complex computing systems and resources reach exhaustion, it becomes necessary to begin storing incoming commands until resources become available. The computing power required to store, manage and retrieve commands increases overall latencies and can become quite inefficient; producing additional resource starvation until he system begins to bog down. In the most extreme cases, resource starvation can increase to the point where more system resources are being utilized to manage the low resource condition than is available for the actual work that the computing system is designed to perform.

By way of example, consider the concept of resource exhaustion applied to a data storage array controller, which uses a pool of cache memory buffers to store and aggregate data to be written to a group of mechanical storage devices. Once the available pool of cache buffers has been exhausted, the array controller begins storing incoming commands in a queue and wait for more buffers to become available. As more and more commands begin to back up in the waiting queue, command latencies grow, and the requesting devices begin to exhaust their command time out values. This causes the requesting devices to then issue command abort requests to the array controller, which forces the consumption of additional resources to locate and remove commands and data from the processing queues. In the most extreme of cases, so much computing power is being used to process command abort operations that most of the commands coming into the array controller end up being aborted by the requesting device, and what appears to be a deadlock occurs. In addition to the resource exhaustion in the array controller device itself, this command backup scenario extends to the systems making the requests as well, as they are forced to handle more and more abort and retry operations on top of the ongoing workload generating the requests.

One mechanism for resource management involves the constant monitoring of usage levels of critical resources within a computing system, and the rejection of requests as they are received, which require resources that are nearing exhaustion. Rejection of commands that require the nearly exhausted resource would then continue until such time as the amount of available resource increased to an acceptable level. This approach also has the advantage of allowing the requesting systems to be aware of the fact that resource exhaustion has occurred and allows them to implement algorithms of their own to deal proactively with the exhaustion rather than reactively with command aborts and retries. This method of resource management avoids the additional resource starvation created when long latencies begin to back up a computing system and large waiting queues build up, but it has been shown in fact to create several new problems, which need to be addressed. The first problem is that this type of resource management works like an on off switch, causing erratic system throughput and "saw tooth" performance curves. Requesting systems are ether allowed to run free, or are stopped down to executing only one command at a time. The second problem this approach creates is that one or a small number of requesting systems may consume all of the available resources in the system, thus creating possible long latencies for systems that have much lower usage levels. In usage modeling, it has been shown that the simple resource management scheme, while providing relief to the system it is running on, actually causes more problems than it solves on a system wide basis, and often results in the disabling of the feature in field installations. In some cases, specific computer operating systems perform so badly in an environment running this type of resource management scheme, that it must be disabled when systems running those operating systems are present in the environment.

BRIEF DESCRIPTION OF THE DRAWINGS

Embodiments of the invention relating to both structure and method of operation may best be understood by referring to the following description and accompanying drawings.

DETAILED DESCRIPTION

Described herein are exemplary systems and methods for critical resource management in a computer system. The methods described herein may be embodied as logic instructions stored on a computer-readable medium. When executed on a processor, the logic instructions cause a general processor to be programmed as a special-purpose machine that implements the described methods. The processor, when configured by the logic instructions to execute the methods recited herein, constitutes structure for performing the described methods.

In order to address the resource management issues described above, a new algorithm described herein provides a cushioning mechanism to avoid saw tooth performance curves and utilizes a fairness algorithm, which provides that all requesting systems are given a fair share of the available resources. This algorithm monitors resources and the number of active systems attempting to utilize system resources. When a critical resource usage is nearing exhaustion, remaining resources are allocated evenly by taking the total number of available resources and dividing them by the total number of active requesters. Systems that are below their allocation of resources are allowed to process requests freely, while systems that are above their allocation of resources have their requests denied. As additional resources are utilized, each requestor is allocated less and less outstanding requests until, in the most extreme cases, all requesters are limited to only one request at a time.

Figure 1:
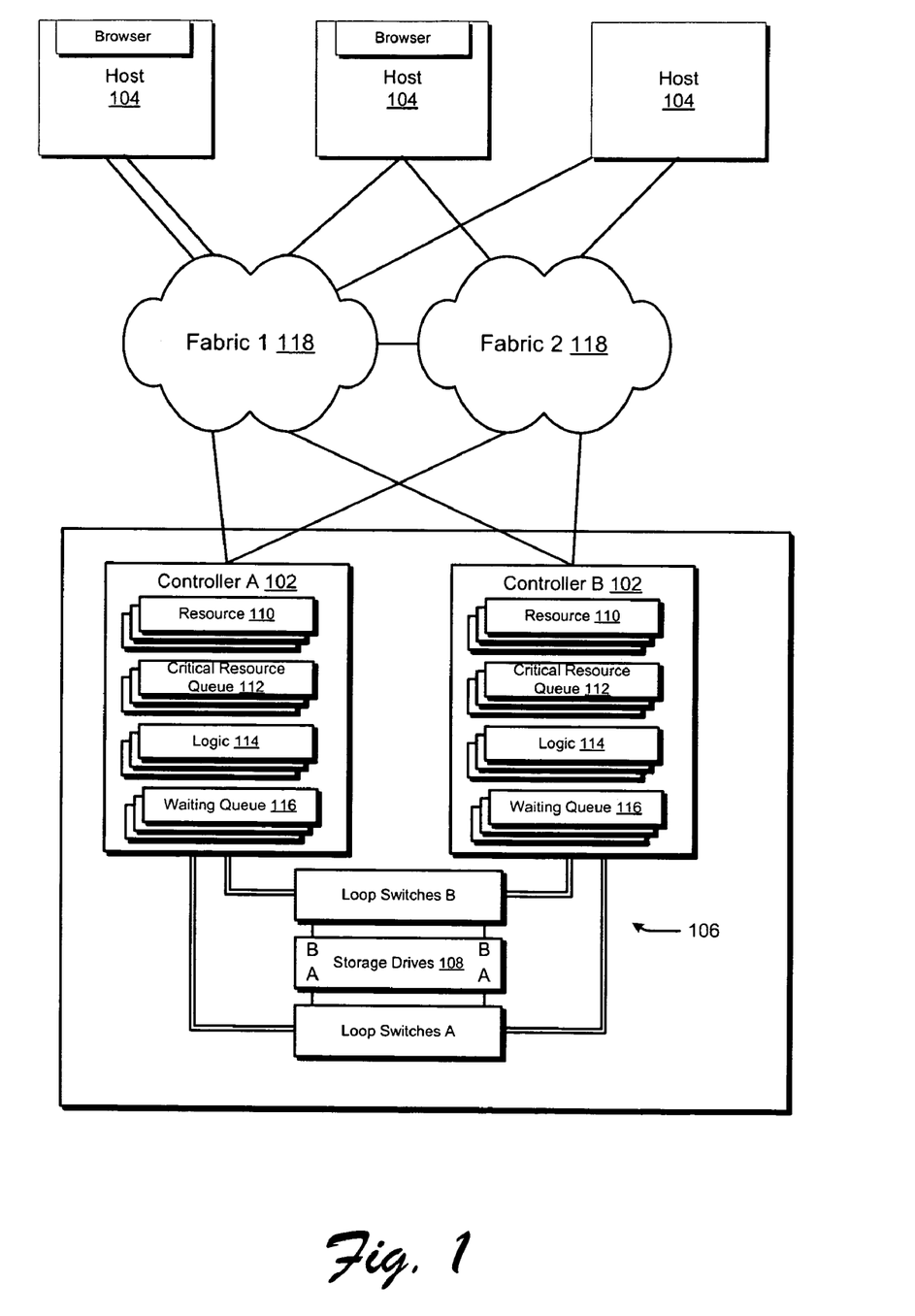
FIG. 1 is a schematic block diagram illustrating an embodiment of a storage system that is capable of improving performance with respect to overall input/output operation latency.

Referring to FIG. 1, a schematic block diagram illustrates an embodiment of a storage system 100 that is capable of improving performance with respect to overall input/output operation latency. The storage system 100 includes one or more storage controllers 102 capable of controlling data transfers between at least one host adapter 104 coupled via switching one or more switching fabrics 118 and at least one storage array 106. The storage arrays 106 typically include a large capacity of physical storage, for example in storage disk drives 108, and are configured as logical storage, generally arranged in logical units (LUNs).

The storage system further includes at least one resource 110 that is utilized in the data transfers, and at least one critical resource queue 112 respectively associated with the resource 110. Various resources may affect overall input/output latency and throughput, and thus may be considered "critical" resources. Examples of such resources include dynamic caching structures, queues, buffers, remote copy resources, cache dirty blocks, remote copy resources, disk wait queues, and others.

The critical resource queues 112 queue accesses of the associated resources 110. A logic 114, for example a processor or controller in the storage controllers 102, monitors the critical resource queues 112 for a predetermined or pre-defined high consumption condition, and identifies an adapter/LUN combination associated with a command that contributes to the high consumption condition. The logic 114 queues the identified adapter/LUN combination on a waiting queue, and prevents subsequent commands of the identified adapter/LUN combination.

In some implementations, the logic 114 subsequently detects a decline in resource consumption and dequeues the adapter/LUN combination identifier from the waiting queue, then re-enables commands of the dequeued adapter/LUN combination.

Generally, the illustrative system and technique for attaining efficient host throttling are applied for host adapters 104 that require a specific resource 110. Host adapters that do not require a specific resource generally use any available resource. Accordingly, the logic 114 can manage critical resource usage for host adapters 104 that require a specific resource 110.

In some implementations, the logic 114 detects receipt of a command from an adapter 104 to a LUN that increases consumption of a particular resource 110 that is concurrently burdened by multiple executing commands to a level above a limit or threshold, and sets a flag indicative of a critical condition of the resource. Implementations may detect increased consumption according to various other high consumption criteria such as an increased rate of command delivery, a preponderance of particular types of burdensome traffic, or other conditions that may be detected with additional analysis.

In some embodiments, the logic 114 detects an increase consumption of a particular resource 110 to a level above the pre-selected limit, and queues an identifier of the adapter/LUN combination on a waiting queue 116 associated with the resource 110. The logic 114 can also detect a decline in consumption of the resource 110. In response to a decline in consumption, the logic 114 removes an adapter/LUN combination identifier from the waiting queue 116 in the queue order and enables subsequent commands of the adapter/LUN combination removed from the waiting queue 116.

Various criteria may be tracked to monitor consumption. For example, a decline in consumption may be discernible simply as a decrease in queue depth below a limit or threshold. In a particular implementation, the waiting queue 116 may be freed more aggressively as the queue becomes less full, a technique that is possible because freeing of a waiting queue does not necessarily generate another usage of the critical resource. For example, if the critical resource is nearly in a critical state with a queue depth D, and the current queue depth after returning a resource is C, then the number of adapter/LUN combinations freed can be D-C.

Figure 2:
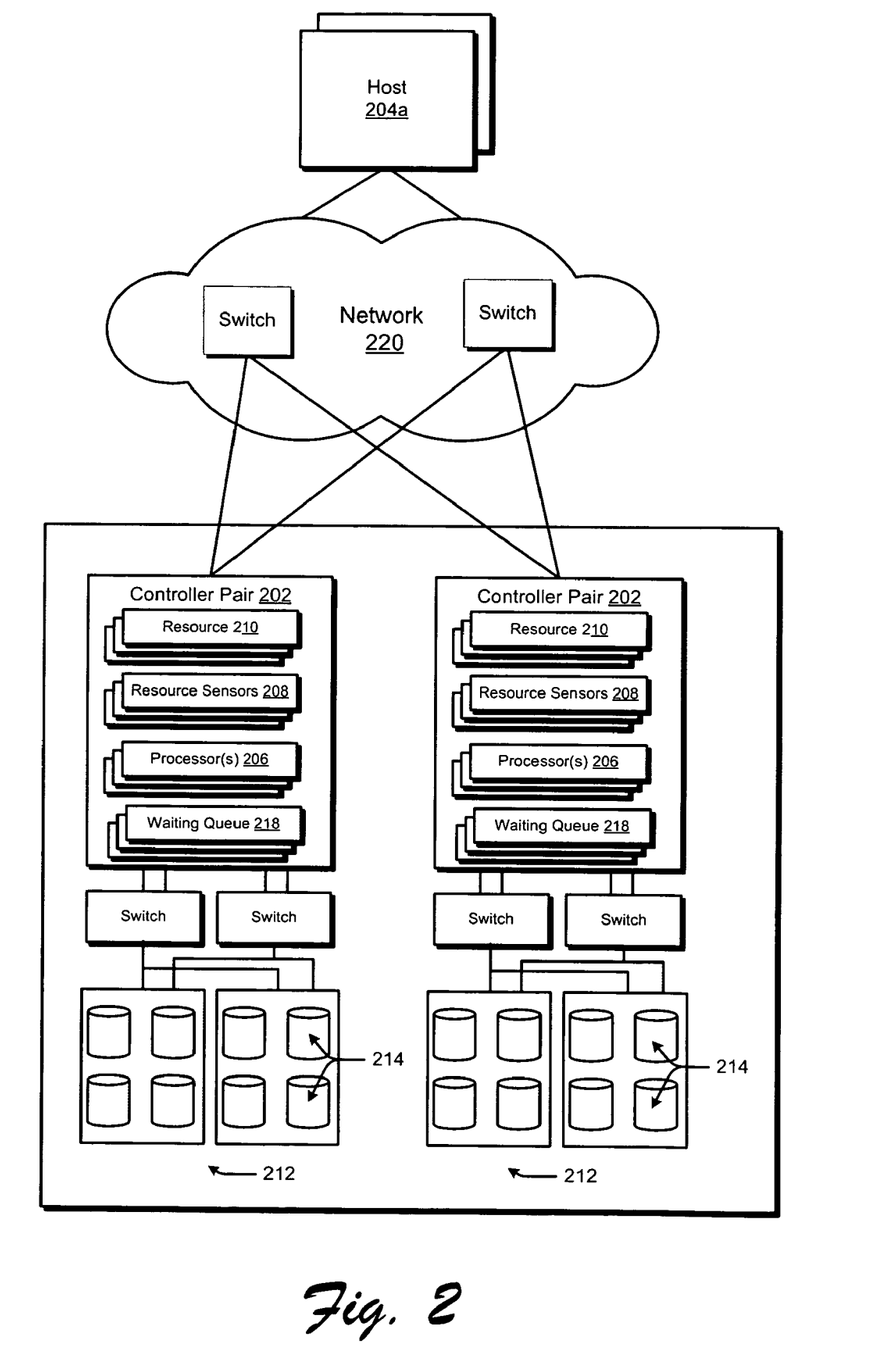
FIG. 2 is a schematic block diagram depicting an alternative embodiment of a storage system that includes a resource management system to enable a storage controller to throttle host input/output activity.

Referring to FIG. 2, a schematic block diagram illustrates an embodiment of a storage system 200 that includes a resource management system to enable a storage controller 202 to manage host input/output activity. In some embodiments, the resource management system enables a controller 202 to throttle host input/output traffic that specifies usage of a particular internal resource when that resource is heavily utilized. In a particular embodiment, only those host adapters 204, also called hosts, that specify the particular resource are constrained to wait for availability of the resource. The resource management system implements a "fairness" technique that enables each host 204 to perform input/output commands in the order of command denial as resources again become available.

The resource management system typically responds to input/output commands rejected due to resource starvation by returning either a QUEUE FULL or BUSY response, depending on the definition of the particular invoked operating system.

For hosts that may have unsatisfactory performance in response to resource management system behavior, some embodiments may allow the resource management system to be disabled for all host types.

The storage system 200 and associated resource management system may be extensible to enable addition of sensors.

In an illustrative embodiment, the resource management system can execute in processors 206 internal to the storage controllers 202. Controller routines that result in consumption of any monitored critical resources execute a macro, called a resource-use macro. A "critical" resource is one that degrades latency performance in high usage conditions. Controller routines that free such a critical resource execute a macro, called a resource-free macro.

The resource management system defines one or more resource sensors 208. Individual resource sensors 208 use an indexed structure to monitor associated respective resources 210. In some embodiments, the resource sensor structure contains a current count of resources consumed, a maximum quota value for that particular resource and pointers to the first and last entry in a waiter queue. Multiple sets of macros can be defined and used to enable manipulation of the use count, resources required, and the waiter queue. An example of a resource sensor structure is shown as follows:

```
typedef struct_critical_resource
{
ushort cur;          /* Current queue count */
ushort max;          /* Maximum queue count */
ulong qfirst;        /* First waiter */
ulong qlast;         /* Last waiter */
} critical_resources;
```

Each resource sensor structure maintains a maximum value for the specific resource that is monitored, a parameter that indicates the number of connections waiting for this resource, and a parameter for the maximum queue depth for the resource on the controller that houses the resource sensor structure. The resource sensor structure may also maintain a parameter for the maximum queue depth for the resource on a peer controller.

If consumption of a specific resource exceeds the specified limit, a corresponding bit is set in the critical resources flag indicating that the resource is near exhaustion. Upon receipt of a command requiring a specific resource that has exceeded the predetermine quota, critical resource management procedures place commands in a waiting queue. In the illustrative embodiment, the storage controller 202 controls one or more storage arrays 212 that include a plurality of storage drives 214. The storage arrays 212 and drives 214 make up physical storage that can be configured as logical storage in logical units (LUNs). The adapter 204 and LUN are termed an "adapter/LUN combination". An index identifying the specific adapter/LUN combination is placed on a waiting queue 218 to wait for more resources to become available.

As resources 210 become available, adapter/LUN combinations are removed from the waiting queue 218 and allowed to perform additional input/output commands. An exhausted bit for a specific resource remains set until the last adapter/LUN combination is removed from the waiting queue 218, enabling the system's input/output command pipeline to drain a suitable amount before additional heavy input/output loading resumes. An aspect of the behavior is that a host adapter 204 may return from the queue, perform a predetermined number of additional successful input/output commands, and then be placed back at the end of the queue again. In an illustrative embodiment, one additional command is performed.

In a particular system embodiment that includes Small Computer Systems Interface (SCSI) functionality, a storage controller 202 can receive commands from an adapter 204, for example at HP$NEW, a host port entry for SCSI commands received from an adapter 204. HP$NEW performs operations such as validating commands for execution. One example of a validation operation is checking of flags or bits to determined whether the command is to be disabled due to the high consumption condition. At a point in HP$NEW at which a command is validated sufficiently that the command is to be executed, and the command is determined to be a READ or WRITE operation, the critical resource flags or bits are examined to determine whether a required resource has reached a limit or quota. If a required resource is exhausted, as determined by the critical resource bits, a disable flag or bit is set to indicate that no additional WRITE and/or READ input/output operation is to be allowed through the particular adapter/LUN combination. A macro, for example CR_QUEUE_WAITER, is executed to place the adapter/LUN combination on the waiting queue 218. The command in the process is then allowed to proceed normally through the execution pipeline. At an earlier point in execution of HP$NEW, for example after precursory checks for the command are performed, additional input/output traffic is diverted from an execution critical path to HP$NEW_UNUSUAL, which queues commands blocked by a busy status of a resource, thereby reducing or minimizing processing of the blocked commands.

In an illustrative system, macros are supplied for manipulation of the resource sensor current queue count.

CR_USE_WR_RESOURCE (CR_IDX) is a resource sensor current queue count manipulation macro that enables a command to use a Write resource. CR_IDX is an index identifier of the pertinent critical resource. The macro increases the queue count and checks for critical usage.

CR_USE_RW_RESOURCE (CR_IDX) is a resource sensor current queue count manipulation macro that enables a command to use a Read/Write resource. CR_IDX is an index identifier of the pertinent critical resource. The macro increases the queue count and checks for critical usage.

CR_FREE_WR_RESOURCE (CR_IDX) is a resource sensor current queue count manipulation macro that frees a Write resource.

CR_FREE_RW_RESOURCE (CR_IDX) is a resource sensor current queue count manipulation macro that frees a Read/Write resource.

Some macros are resource required manipulation macros.

CR_SET_RESOURCE_IN_USE (CR_IDX, UNIT) is a resource required manipulation macro specifying that the particular UNIT requires a specific resource. UNIT identifies a particular adapter 204 or other device, operating as a client. The macro identifies the specific client and the specific resource that is required for use by the client.

CR_FREE_RESOURCE_IN_USE (CR_IDX, UNIT) is a resource required manipulation macro that indicates the particular UNIT does not require a specific resource. Accordingly, the adapter or other client identified by UNIT is dissociated from the specific resource.

CR_CLEAR_DRM_TUNNEL_RESOURCE (UNIT) is a resource required manipulation macro that indicates the particular UNIT requires no Digital Resource Management (DRM) Tunnel resources.

Other macros are waiting queue manipulation macros.

CR_QUEUE_WAITER (ACB, LUN, CR_MASK, LW) is a waiting queue manipulation macro that adds an adapter/LUN combination to the waiting queue 218 for the resource specified in CR_MASK/LW. ACB is an index to the adapter control block and LUN identifies the logical unit for the pertinent adapter/LUN combination.

CR_FREE_RW_WAITERS (CR_IDX, COUNT) is a waiting queue manipulation macro that removes a number of adapter/LUN combinations identified by the COUNT field from the waiting queue 218. The identified adapter/LUN combinations are waiting for the waiting queue 218 associated with the critical resource identified by the CR_IDX field. The macro also clears both Read and Write flags when the last waiting adapter/LUN combination index is removed from the waiting queue 218.

CR_FREE_ALL_RW_WAITERS (CR_IDX) is a waiting queue manipulation macro that frees all adapter/LUN combinations waiting for the critical resource identified by the CR_IDX field, and clears both Read and Write flags when the last waiting adapter/LUN combination index is removed from the waiting queue 218.

CR_FREE_RW_WAITERS (CR_IDX, COUNT) is a waiting queue manipulation macro that removes the number of adapter/LUN combinations identified by the COUNT field from the waiting queue 218. The identified adapter/LUN combinations are waiting for the waiting queue 218 associated with the critical resource identified by the CR_IDX field. The macro also clears the Write flag when the last waiting adapter/LUN combination index is removed from the waiting queue 218.

CR_FREE_ALL_WR_WAITERS (CR_IDX) is a waiting queue manipulation macro that frees all adapter/LUN combinations waiting for the critical resource identified by the CR_IDX field, and clears the Write flag when the last waiting adapter/LUN combination index is removed from the waiting queue 218.

Various resources 210 may be managed using the disclosed techniques, depending on constituent devices, components, and characteristics of the data handling system. Sensors 208 implemented in a particular embodiment include Data Replication Manager (DRM) tunnels for peer-to-peer data replication, cache dirty block waiting queues, and disk unit waiting queues. Indices can be allocated for subsequent addition of sensors.

DRM tunnels have limited resources for transferring write commands from a digital resource source to a digital resource destination. As the number of writes to the controller 202 that are to be replicated increases, the tunnel depletes resources and further write commands are queued to a DRM tunnel resource queue, one of the critical resources in the system 200.

Cache dirty block waiting queues can be another critical resource 210. Write commands are accepted by the controller 202, placed in a controller cache as dirty data, and later flushed to disks 214 in the storage array 212. The controller 202 limits the amount of "dirty" data that the cache may contain. Once the limit is reached, additional write commands are queued, waiting for a cache flush to reduce the level of dirty data.

Management of the critical resources waiting queue 218 is performed using the Adapter Control Block (ACB) index and logical unit (LUN) of a specific input/output path to form a pointer into a fixed-size, pre-allocated table. Once an adapter/LUN combination has used some amount of a critical resource, the adapter/LUN combination is queued to the critical resource waiting queue 218. Each critical resource 210 has an associated critical resource waiting queue 218. A particular implementation has five queues, four allocated to digital resource tunnels and one to cache dirty block waiting queues. When a critical resource becomes available for use, the adapter/LUN combination is dequeued.

The resource management system can be implemented to return a SCSI status of either QUEUE FULL or BUSY in response to commands for which a resource designated as required has reached the consumption quota or limit. Default behavior can be to return a QUEUE FULL status to such commands. An alternate status of BUSY can be returned by specification by the Host Mode of the adaptor executing the command.

Some adaptors may include a control capability to enable and disable resource management system functionality.

FIG. 2 illustrates a storage system 200 that includes controllers 202 arranged in pairs, and including multiple storage arrays 212 and controller pairs. The resource management system can be implemented in either or both controllers in a pair, or in a remote controller 202 via a network 220. Inter-controller resource management can be implemented in a continuous access configuration to prevent input/output traffic on a client, such as an adapter, from overwhelming a server. Inter-controller resource management also can be implemented to fairly allocate access of clients to a server.

Figure 3:
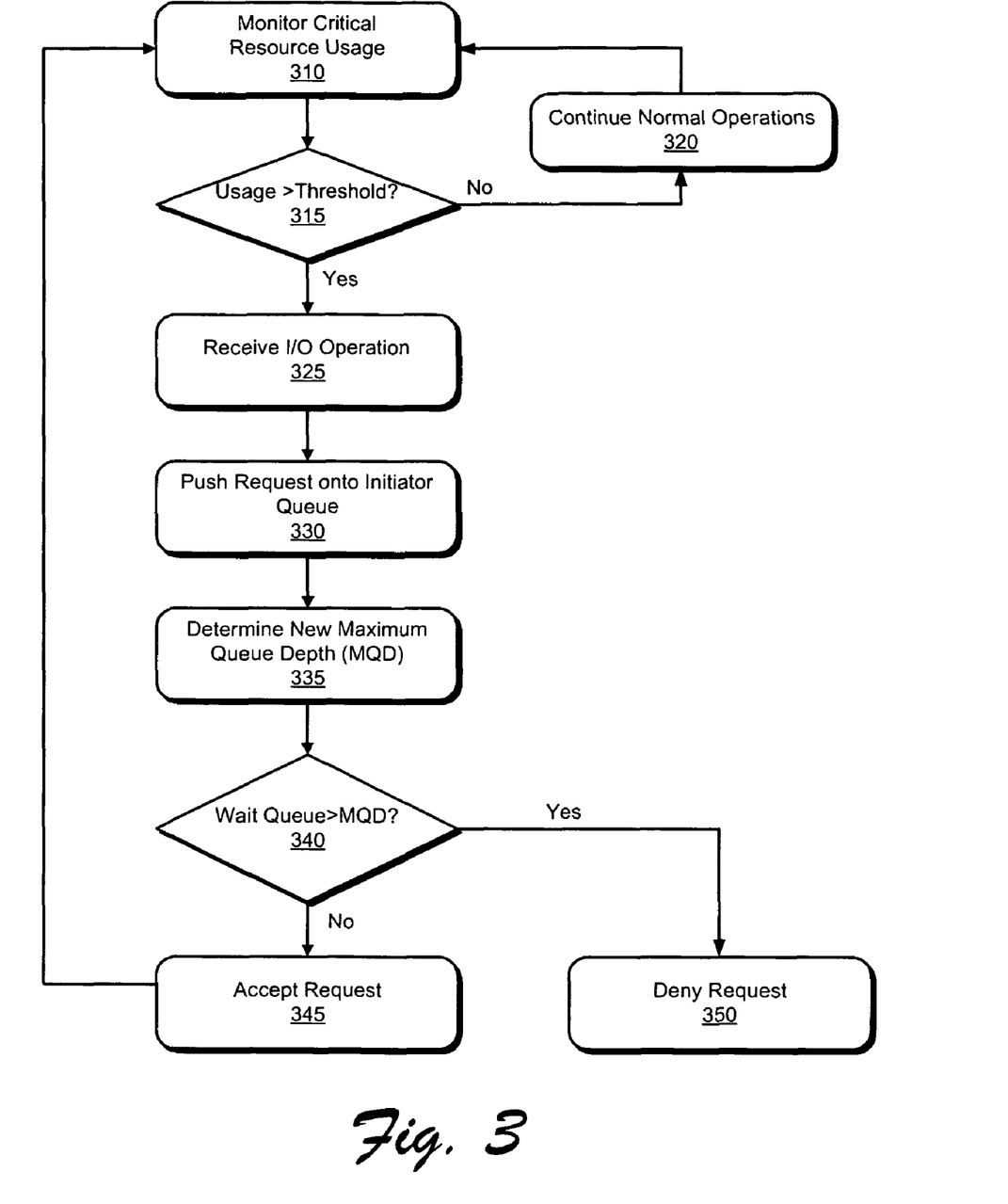
FIG. 3 is a flow chart showing an embodiment of a method capable of usage by a data handling system for managing critical resource usage.

Referring to FIG. 3, a flow chart depicts an embodiment of a method 300 capable of usage by a data handling system for managing critical resource usage. The method can be performed on a controller or processor that executes resource management functionality in a data path or pipeline between one or more clients and one or more servers. The method executes over time and, at operation 310 monitors the usage of one or more critical resources. For example, in one embodiment the queue depth in at least one critical resource queue may be monitored to detect resource consumption greater than a threshold. If, at operation 315, the critical resource usage fails to exceed a threshold, control passes to operation 320 and the storage controller continues normal operations.

By contrast, if at operation 325 the usage exceeds the threshold, then the storage controller enters a critical resource management mode. Control then passes to operation 325 and an input/output operation is received from a host computer such as, e.g., host 204 depicted in FIG. 2. The input/output operation identifies the host computer that originated the request and a storage unit (e.g., a logical unit or LUN) against which the input/output operation is to be executed.

At operation 330 the input/output operation is pushed onto a queue of initiators which are requesting input/output operations during a resource shortage condition. At operation 335 a new maximum queue depth (MQD) for the resource is determined. In some embodiment the MQD is determined by dividing the number of available resources by the number of initiators (i.e., commands) waiting for the resource. The total number of available commands is reduced by the amount that the count or resources used exceeds the maximum allowed before the MQD calculation. If the count of resources used exceeds the maximum by fifty percent, then the MQD is set to one.

Once the MQD is determined, control passes to operation 340. If, at operation 340, the wait queue depth for the resource identified in the input/output operation does not exceed the MQD, then control passes to operation 345 and the input/output operation is accepted. Control then passes back to operation 310.

By contrast, if at operation 340 the length of the wait queue exceeds the MQD, then the input/output operation request is denied. In some embodiments, the storage controller may transmit a message to the host indicating that the input/output operation has been blocked.

When resource consumption declines and normal operations are resumed, the client/server combination identifier may be removed from the waiting queue in queuing order. Commands of the client/server combination are re-enabled. In a particular embodiment, commands of a client/server combination are re-enabled in order of queuing as resource availability is restored.

A typical resource management implementation manages critical resource usage for clients that require usage of a specific resource. For example, a client not requiring a specific resource typically can use any available resource.

In a particular embodiment, the method can be implemented in a storage system that includes one or more storage controllers, one or more host adapters operational as clients, and one or more storage arrays configured as physical storage and logical storage. The logical storage can be arranged in logical units (LUNs) that are operational as servers. An adapter/LUN combination is operational as a client/server combination. Resources for the storage system may include dynamic caching structures, queues, buffers, remote copy resources, cache dirty blocks, disk wait queues, and others, depending on the particular system configuration.

Figure 4A:
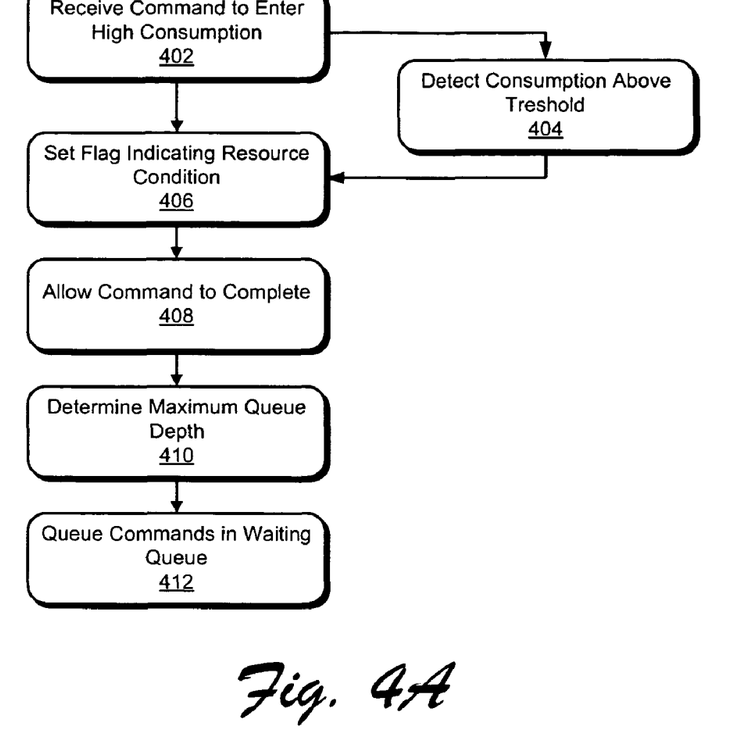
FIGS. 4A and 4B are flow charts that depict another embodiment of a method capable of usage by a data handling system for managing critical resource usage.
Figure 4B:
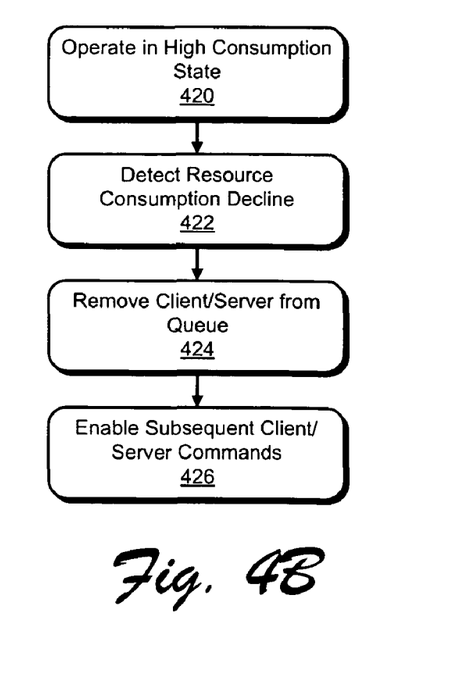

Referring to FIGS. 4A and 4B, flow charts depict another embodiment of a method 400 capable of performance by a data handling system for managing critical resource usage. The method implements resource management functionality in a data path or pipeline between one or more clients and one or more servers. Referring to FIG. 4A, a command from a client to a server is received 402 that increases consumption of a resource to a high consumption condition, which may be termed a "critical" condition. For example, a resource manager can detect 404 an increase in consumption of a resource above a threshold. The resource manager sets 406 a flag indicative of a critical condition for the resource. The resource manager allows 408 the command to complete and determines 410 a maximum queue depth for the resource, then queues 412 commands in a waiting queue when the maximum queue depth exceeds a threshold.

Referring to FIG. 4B, generally when the resource manager is managing a resource in a high consumption state 420, the resource manager may detect 422 a decline in consumption of the resource. In response to reduced consumption, a client/server combination identifier is removed 424 or popped from the waiting queue in the queue order. Subsequent commands of the client/server combination that is removed from the waiting queue are enabled 426.

Some host types may be able to handle the Queue Full or Busy response generated by the critical resource management operations. Thus, in some embodiments the firmware checks the adapter to determine whether a DISABLE_CRITICAL_ RESOURCE_MGM bit is set. If any Adapters with LUNs presented have this bit set, the entire CRM system is disabled. Conversely if no Adapters with LUNs presented have this bit set, the CRM system is reactivated.

With the addition of Active/Active Host Port functionality, CRM has been extended so that both controllers work in unison to block I/O when a critical resource is exhausted. In some embodiments, critical resource monitoring is done only on the master controller and information about critical resource shortages is sent to the proxy controller via an MFC packet when shortages are detected or resources become available again. When a command is being processed in the proxy side, critical resources required to process the command on the master side are checked. If a shortage is detected, the access bits for the Adapter/LUN combination on the proxy side are updated to block further I/O that requires the specific resource. A flag is set in the MFC that may be used to send the command to the master controller indicating that this has been done. When a proxy command MFC is received and processed on the master controller, critical resources are checked, and if found to be still exhausted, the Adapter/LUN combination is placed on the CRM waiter queue and the command is then processed normally. When the required resource is no longer exhausted and an Adapter/LUN combination is removed from the waiter queue on the master controller, an MFC is sent to the proxy controller, and the Adapter/LUN combination is unblocked on that side as well.

The various functions, processes, methods, and operations performed or executed by the system can be implemented as programs that are executable on various types of processors, controllers, central processing units, microprocessors, digital signal processors, state machines, programmable logic arrays, and the like. The programs can be stored on any computer-readable storage medium for use by or in connection with any computer-related system or method. A computer-readable storage medium is an electronic, magnetic, optical, or other physical device that can contain or store a computer program for use by or in connection with a computer-related system, method, process, or procedure. Programs can be embodied in a computer-readable storage medium for use by or in connection with an instruction execution system, device, component, element, or apparatus, such as a system based on a computer or processor, or other system that can fetch instructions from an instruction memory or storage of any appropriate type.

The illustrative block diagrams and flow charts depict process steps or blocks that may represent modules, segments, or portions of code that include one or more executable instructions for implementing specific logical functions or steps in the process. Although the particular examples illustrate specific process steps or acts, many alternative implementations are possible and commonly made by simple design choice. Acts and steps may be executed in different order from the specific description herein, based on considerations of function, purpose, conformance to standard, legacy structure, and the like.

Figure 5:
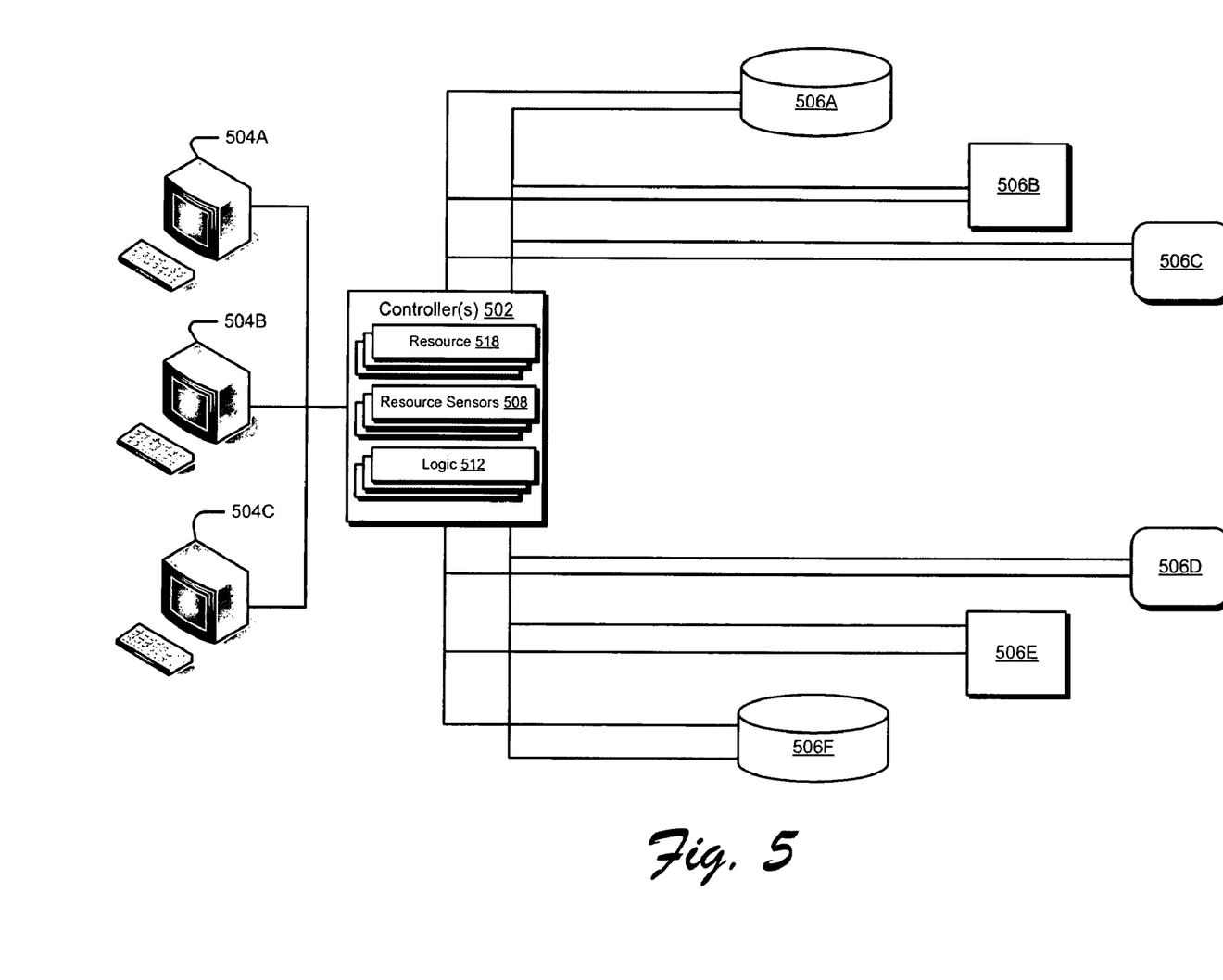
FIG. 5 is a schematic block diagram illustrating an embodiment of a data handling system including one or more controllers capable of controlling data transfers between at least one client and at least one server.

Referring to FIG. 5, a schematic block diagram illustrates an embodiment of a data handling system 500 that includes one or more controllers 502 capable of controlling data transfers between at least one client 504A-C and at least one server 506A-F. The system further includes one or more resources 508 for usage in performing data transfers and one or more critical resource queues 510 that are respectively associated with the resources 508 and can queue accesses to the associated resource 508. The system 500 further includes a logic 512, such as a processor or central processing unit (CPU), controller, and the like. The logic 512 executes various operations such as a resource management operation. In a particular example, the logic 512 monitors the critical resource queues 510 to detect a predetermined high consumption condition. The logic 512 identifies a source/client combination associated with a command that contributes to the high consumption condition and queues the identified source/client combination on a waiting queue 514. For a queued source/client combination, the logic 512 prevents subsequent commands for the identified source/client combination.

In various data handling system implementations, the controllers 502 can take several forms, such as data hubs, routers, bridges, storage controllers, communication controllers, network management devices, and the like. Similarly, the clients 504A-C may similarly be in different forms such as computers, hosts, adapters, on-line terminals, point-of-sale terminals, laptop computers, palm computers, Asynchronous Transfer Mode (ATM) terminals, and many others. Also, the servers 506A-F may be different types of server devices capable of performing a variety of services for the clients. Some systems 500 may include many different server types. Others may include only a single server type. Any suitable type of servers 506A-F may be included in the data handling system including various storage system servers such as storage arrays or logical units (LUNs), or in various database servers, communication servers, computing system servers, and the like.

In some implementations, the logic 512 detects receipt of a command from a client 504A-C to a server 506A-F that increases consumption of a resource 508 to a level above a preselected limit. If so, the logic 512 sets a flag indicative of a high consumption condition, for example called a critical condition, of the resource 508. The logic 512 allows the received command to complete, and rejects subsequent commands issued by the client 504A-C to the server 506A-F.

Also in some implementations, the logic 512 may detect an increase consumption of a resource 508 to a level above the preselected limit and queue an identifier of the client/server combination on a waiting queue 514 associated with the resource 508. The logic 512 may also detect a decline in consumption of the resource 508 and respond by removing a client/server combination identifier from the waiting queue 514 in the order in which the identifiers were placed on the queue. The logic 512 enables subsequent commands of the client/server combination removed from the waiting queue 514.

Reference in the specification to "one embodiment" or "an embodiment" means that a particular feature, structure, or characteristic described in connection with the embodiment is included in at least an implementation. The appearances of the phrase "in one embodiment" in various places in the specification are not necessarily all referring to the same embodiment.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. For example, the illustrative resource management techniques may be implemented in any types of storage systems that are appropriate for such techniques, including any appropriate media. Similarly, the illustrative techniques may be implemented in any appropriate storage system architecture. The task management techniques may further be implemented in devices other than storage systems including computer systems, data processors, application-specific controllers, communication systems, and the like.

What is claimed is:

1. A method of managing critical resource usage in a storage network comprising:
   monitoring a queue depth for a critical resource having a maximum queue depth;
   receiving an I/O (input/output) operation from a host for the critical resource;
   executing the I/O operation when the queue depth is below a threshold;
   calculating a new maximum queue depth for the critical resource when the queue depth for the critical resource exceeds the threshold;
   receiving a subsequent I/O operation from the host for the critical resource;
   placing the subsequent I/O operation in a waiting queue;
   blocking the subsequent I/O operation when the waiting queue has a queue depth that exceeds the new maximum queue depth;
   transmitting the new maximum queue depth to a peer storage controller;
   receiving, in the peer storage controller, an I/O operation from the host that identifies a storage unit; and
   processing the I/O operation using the new maximum queue depth, wherein the new maximum queue depth is calculated by dividing a number of available resources by a number of initiators waiting for the resources.

2. The method of claim 1, further comprising transmitting to the host a message indicating that the subsequent I/O operation has been blocked.

3. The method of claim 1, further comprising:
   detecting a drop in usage of the critical resource; and
   enabling one or more I/O on the waiting queue.

4. The method of claim 3, further comprising:
   enabling one or more subsequent input/output operations.

5. A storage controller, comprising:
   a processor;
   a memory module comprising logic instructions stored in a computer-readable medium which, when executed by the processor, configure the controller to:
   receive, in the storage controller, an input/output operation from a host, wherein the input/output operation identifies a storage unit in a storage network and a critical resource in the storage network has a maximum queue depth;
   place the input/output operation in a waiting queue;
   determine a new maximum queue depth for the critical resource required to execute the input/output operation against the storage unit;
   block one or more subsequent input/output (I/O) operations from the host for the storage unit when the waiting queue for the critical resource exceeds the new maximum queue depth;
   transmit the new maximum queue depth to a peer storage controller;
   receive, in the peer storage controller, an I/O operation from the host that identifies a storage unit; and
   process the I/O operation using the new maximum queue depth, wherein the new maximum queue depth is calculated by dividing a number of available resources by a number of initiators waiting for the resources.

6. The storage controller of claim 5, further comprising logic instructions stored on a computer-readable medium which, when executed, configure the controller to transmit to the host a message indicating that the input/output operation has been blocked.

7. The storage controller of claim 5, further comprising logic instructions stored on a computer-readable medium which, when executed, configure the controller to:
   detect a drop in usage of the critical resource; and
   enable one or more input/operations on the waiting queue.

8. The storage controller of claim 7, further comprising logic instructions stored on a computer-readable medium which, when executed, configure the controller to:
   enable one or more subsequent input/output operations.

9. A computer program product comprising logic instructions stored in a computer-readable storage medium which, when executed by a processor in a storage controller, configure the controller to:
   receive, in the storage controller, an input/output operation from a host, wherein the input/output operation identifies a storage unit in a storage network and a critical resource in the storage network has a maximum queue depth;
   place the input/output operation in a waiting queue;
   determine a new maximum queue depth for the critical resource required to execute the input/output operation against the storage unit;
   block one or more subsequent input/output operations from the host for the storage unit when the waiting queue for the critical resource exceeds the new maximum queue depth;
   transmit the new maximum queue depth to a peer storage controller;
   receive, in a peer storage controller, an input/output operation that from the host that identifies the storage unit; and
   process the input/output operation using the new maximum queue depth, wherein the new maximum queue depth is determined by dividing a number of available resources by a number of initiators waiting for the resources.

10. The computer program product of claim 9, further comprising logic instructions stored on a computer-readable storage medium which, when executed, configure the controller to transmit to the host a message indicating that the input/output operation has been blocked.

11. The computer program product of claim 9, further comprising logic instructions stored on a computer-readable storage medium which, when executed, configure the controller to:
   detect a drop in usage of the critical resource; and
   enable one or more input/operations on the waiting queue.

* * * * *

UNITED STATES PATENT AND TRADEMARK OFFICE
CERTIFICATE OF CORRECTION

| | | |
|---|---|---|
| PATENT NO. | : 7,934,027 B2 | Page 1 of 1 |
| APPLICATION NO. | : 11/655456 | |
| DATED | : April 26, 2011 | |
| INVENTOR(S) | : Thomas Cooke et al. | |

It is certified that error appears in the above-identified patent and that said Letters Patent is hereby corrected as shown below:

In column 12, line 23, in Claim 7, delete "input/operations" and insert -- input/output operations --, therefor.

In column 12, line 64, in Claim 11, delete "input/operations" and insert -- input/output operations --, therefor.

Signed and Sealed this
Twentieth Day of September, 2011

David J. Kappos
*Director of the United States Patent and Trademark Office*